Patented Apr. 15, 1947

2,419,073

UNITED STATES PATENT OFFICE 2,419,073

METHOD FOR CONTROLLING PARASITES IN SOIL

Oscar H. Hammer, South Haven, Mich., assignor to The Dow Chemical Company, Midland, Mich., a corporation of Michigan No Drawing. Application January 30, 1943, Serial No. 474,175

4 Claims. (Cl. 47—58)

The present invention relates to the control of parasites and is particularly directed to a method for preventing the attack of plants by borers and soil organisms.

Volatile organic liquids have been employed in fumigation procedures for the control of a variety of insect pests, the scope of the operation varying from large scale fumigation of enclosed chambers, rooms, and buildings to the spot fumigation of restricted areas, e. g. borer control adjacent to plants, soil fumigation, etc. The problems attendant to such fumigation practices vary with the particular pest to be controlled and the conditions under which the control is to be accomplished.

Emulsions of ethylene chloride, propylene chloride, and other liquid halo-hydrocarbons have been suggested as toxicants for the control of borer organisms adjacent to living plants, and have replaced solid para-dichlorobenzene for such purpose to an appreciable extent. These halo-hydrocarbons serve essentially as fumigants and are more effective at low soil temperatures than is para-dichlorobenzene whereby they may be employed in the late fall, early spring, or even in winter. The use of para-dichlorobenzene is generally limited to the warm summer months.

While the use of emulsions of the volatile organic liquids for spot fumigation constitutes a definite improvement over the use of the unmodified liquids, disadvantages in such procedure have become apparent which threaten to limit substantially the scope of the new practice. One major problem encountered in this connection is that of maintaining the effective toxicant in sufficiently uniform dispersion to permit close regulation of the amounts applied. The inadequate mixing and application equipment employed by the average operator permits the breaking or stratification of the emulsion during application whereby some trees or plants will be exposed to an excessively large amount of the toxicant and others to an amount insufficient to accomplish the desired control. This results in inconsistent control of borers and other parasitic organisms with substantial injury and destruction of the trees receiving an overdose of toxicant.

A further difficulty is directly attributable to the flow characteristics of liquid fumigants and of aqueous emulsions thereof as heretofore employed. These compositions are of such low viscosity that, when applied to soil around the plant, the liquid tends to be absorbed quickly into the ground and to flow into fissures and soil cracks whereby the root system of the plant is exposed to lethal concentrations of the toxicant. Such inability to control the distribution of toxicant, coupled with its high volatility, may result in severe injury with the eventual destruction of the tree by amounts of material well within normal tolerance limits.

According to the present invention, a new method is provided for the sterilization of soil adjacent to plants whereby borers and other organisms customarily found in the soil for at least a portion of their life cycle are controlled, and existing insect parasites present on the lower plant surfaces and roots are destroyed. This is accomplished by applying in contact with the soil and adjacent to the plant a volatile liquid fumigant dispersed in and on a coarsely subdivided carrier. By proceeding in this fashion it has been found that many of the difficulties previously characterizing operations with volatile liquid fumigants are overcome and control of borer and soil organisms accomplished with a maximum of economy and a minimum of injury to the plant. The expression "borers and soil organisms" as herein employed includes larvae and mature insect pests, nematodes, disease inducing micro-organisms, etc.

Among the advantages inherent to the mode of operation herein described is the convenience with which the application is accomplished. No specialized equipment is required for application and, as stratification is substantially avoided, no mixing or agitation of the composition during application is necessary. The solid carrier with the fumigant dispersed therein is simply contacted with the surface of the soil adjacent to the plant or in a trough around the plant. If desired, the applied material may advantageously be blanketed with soil. Since there is no problem of maintaining the liquid fumigant in dispersion, the possibility of overdosing or underdosing a given plant is avoided, and the application of equal volumes or weights of the composition by the operator ensures that an exactly equivalent amount of liquid fumigant will be made available in each instance. Also, by reason of its physical nature, it is impossible for the composition to soak or run into soil cracks so that injury to the root system does not occur. The liquid phase of the organic fumigant is held by the carrier at the exact point of application and slowly vaporized out of the mixture so as to maintain in the critical area an effective concentration of toxicant over a much longer period than when the unmodified liquid fumigant or an emulsion thereof is employed, Any coarsely subdivided solid carrier nonreactive with the liquid fumigant and non-injurious to plant life may be employed in accordance with the present invention. Representative of such materials are sawdust, wood chips, ground nut shells, coarse wood flour, exploded mica, ground corn cobs, ground ceramics, ceramic blocks, etc. The preferred particle size of the carrier is between ⅛ and ½ inch in diameter. However, carriers running from 1/64 or smaller to ¾ inch or larger in diameter may be employed, depending upon the physical characteristics of the liquid organic fumigant to be dispersed thereon, and the absorptive and adsorptive properties of the carrier.

Volatile liquid organic fumigants which may be employed are ethylene chloride, propylene chloride, isopropyl-benzene, ortho-dichlorobenzene, beta, beta' - dichloro - diethylether, tetrachloroethylene, monochlorobenzene, carbon tetrachloride, chloroform, trichloroethylene, chloropicrin, etc. Similarly, mixtures of two or more of the foregoing or solutions of gaseous fumigants therein are suitable, e. g. a solution of methyl bromide in isopropyl benzene, a solution of methyl bromide in ethylene chloride-carbon tetrachloride mixture, a mixture of ethylene chloride and carbon tetrachloride, a mixture of trichloroethylene and propylene chloride, etc. Other materials which may be included in the mixture of carrier and fumigant are warning agents, high boiling difficultly-volatile organic solvents, etc.

The compositions to be employed in accordance with the new process are readily prepared by wetting the carrier with the liquid fumigant, draining off any excess of the liquid, and packaging the product in air-tight containers. The exact proportions of liquid fumigant and carrier in the composition vary over a wide range depending upon the absorptive and adsorptive properties of the carrier, the specific gravity of the liquid fumigant, the state of subdivision of the carrier, etc. Generally, the amount of liquid fumigant employed is equal to from 1 to 5 times the weight of carrier, although smaller amounts are obviously operable. Where compositions are desired which contain less than the maximum amount of liquid fumigant dispersible in and on the carrier, a convenient mode of operation includes first placing the carrier in the ultimate container, adding the desired amount of liquid fumigant, and thereafter closing the container. It has been found that, upon standing, the liquid fumigant tends to distribute itself uniformly throughout the body of the carrier.

The amount of the composition applied adjacent to the individual plant varies with the tolerance of the plant for vapors of the particular liquid fumigant concerned, the soil temperature at the time of application, the concentration of fumigant in the carrier, and the particular borer or other organism to be controlled. Since the liquid fumigant is given off by the solid carrier over an appreciable period of time, somewhat larger amounts of the fumigant may be safely employed per plant than is possible when using the unmodified fumigant material or emulsions thereof. However, it has been found that adequate control of parasites is obtained when the amount of fumigant present in the mixture as applied is roughly equivalent to that ordinarily recommended for the fumigant alone or in emulsified form.

The following examples illustrate the invention but are not to be construed as limiting the same:

EXAMPLE 1

Compositions were prepared by dispersing a number of volatile liquid organic fumigants on coarsely subdivided carriers. This was accomplished by introducing the carrier into a container, adding the liquid fumigant, sealing the container, and allowing it to stand for a minimum of 12 hours. At the end of this time the liquid fumigant in each instance was found to have distributed itself uniformly throughout the body of the carrier. The various compositions were then applied to the soil adjacent to a number of 10-12 year old peach trees and the degree of control of existing borer insects determined. The compositions were applied either by forming a ring of the solid mixture on the soil around and in contact with the tree or by forming a ring of material around and from 1 to 2 inches away from the tree. In each instance the ring of fumigant mixture was blanketed within a few minutes after application with soil thrown up around the tree. The following compositions and data are representative:

*Composition A*

| | Parts by weight |
|---|---|
| Coarse sawdust | 100 |
| Ethylene chloride | 150 |
| | 250 |

When a 125 gram portion of this composition was employed in contact with the tree, the kill of borers was 98 per cent. When applied at a 1 inch distance from the tree, the composition resulted in a 100 per cent kill of borers.

*Composition B*

| | Parts by weight |
|---|---|
| Coarse sawdust | 100 |
| Propylene chloride | 140 |
| | 240 |

120 gram portions of this composition were applied as described under Composition A. The application in contact with the tree gave a 97 per cent kill of borers, and that somewhat removed from the tree surface, 100 per cent kill.

*Composition C*

| | Parts by weight |
|---|---|
| Coarse sawdust | 100 |
| Ortho-dichlorobenzene | 157 |
| | 257 |

128 gram portions of this mixture were similarly applied to obtain kills of 72 per cent of borers when in contact with the tree and of 73 per cent when somewhat removed therefrom.

*Composition D*

| | Parts by weight |
|---|---|
| Coarse sawdust | 100 |
| Isopropyl-benzene | 104 |
| | 204 |

102 gram portions of this mixture applied in a circle in contact with the peach trees gave average kills of 90 per cent against peach tree borers. When the ring was removed 1-2 inches from contact with the tree, the kill was 95 per cent.

Composition E

| | Parts by weight |
|---|---|
| Exploded mica | 150 |
| Ethylene chloride | 377 |
| | 527 |

105 gram portions of this product were applied to the soil in rings around and against the trunks of peach trees to kill 100 per cent of peach tree borers infesting the soil and lower bark and crown of the subject trees.

Composition F

| | Parts by weight |
|---|---|
| Exploded mica | 150 |
| Propylene chloride | 350 |
| | 500 |

When 100 gram portions of this composition were applied in a ring on the soil and in contact with the peach trees, a kill of 96 per cent of borer organisms resulted.

Composition G

| | Parts by weight |
|---|---|
| Exploded mica | 150 |
| Ortho-dichlorobenzene | 392 |
| | 542 |

108 gram portions of this mixture when similarly employed gave an average kill of 75 per cent of borer organisms.

EXAMPLE 2

In an operation to determine whether or not the new fumigant compositions were injurious to growing plants, a number of 1 year old peach saplings were contacted with compositions including volatile organic fumigants dispersed on exploded mica. The compositions employed were as follows:

Composition H

| | Parts by weight |
|---|---|
| Exploded mica | 150 |
| Ethylene chloride | 226 |
| | 376 |

37.6 gram portions of this mixture were employed in contact with each tree trunk at soil level.

Composition I

| | Parts by weight |
|---|---|
| Exploded mica | 150 |
| Propylene chloride | 210 |
| | 360 |

36 gram portions of this product were applied as described under Composition H.

Composition J

| | Parts by weight |
|---|---|
| Exploded mica | 150 |
| Ortho-dichlorobenzene | 235 |
| | 385 |

38.5 gram portions of this composition were similarly applied.

Observation of the treated trees over a considerable period following application, and inspection of the cambium layer thereof adjacent to the point of contact of the fumigant compositions, indicated a substantial absence of injury attributable to the use of the described compositions. The amounts of liquid fumigant actually present in the compositions as applied were approximately four times those ordinarily recommended for application to 1 year old peach trees.

EXAMPLE 3

Compositions were prepared in which exploded mica and fine sawdust were saturated with various liquid organic fumigants. This was accomplished by wetting the carrier with an excess of the liquid fumigant concerned and then allowing that portion not absorbed or adsorbed to drain out of the mixture over a period of 5 minutes. The increase in weight of the carrier in each instance was taken as the amount of liquid fumigant absorbed. Determinations were then carried out to ascertain the comparative volatility of the several fumigant liquids from the solid dispersions. With very low boiling organic fumigants, it was found that several hours were required for all of the fumigant to be vaporized out of the mixtures. With this class of liquid fumigants, exploded mica was observed to release the fumigant more slowly than did sawdust. With the higher boiling fumigant materials, a period of 6–8 days was required for complete vaporizing of the liquid from the mixture, and sawdust was found to retain the fumigant material for a somewhat longer period than did exploded mica.

Representative of the compositions employed in the foregoing determinations are the following:

Composition K

| | Parts by weight |
|---|---|
| Exploded mica | 100 |
| Methyl bromide 10% by weight<br>Ethylene chloride 67.5% by weight<br>Carbon tetrachloride 22.5% by weight | 140 |
| | 240 |

Composition L

| | Parts by weight |
|---|---|
| Fine sawdust | 100 |
| Beta, beta'-dichloro-diethyl ether | 475 |
| | 575 |

Composition M

| | Parts by weight |
|---|---|
| Exploded mica | 100 |
| Beta, beta'-dichloro-diethyl ether | 205 |
| | 305 |

The foregoing Compositions K, L, and M are adapted to be employed for the treatment of the soil adjacent to growing plants in the manner described under Examples 1 and 2.

The expression "exploded mica" as herein employed is inclusive of any micaceous mineral such as biotite, muscovite, phlogopite, lepidolite, and particularly vermiculite which has been subjected to such treatment as to produce a modified mica product of the type described as expanded, exfoliated, swollen, or intumesced.

A co-pending application, now Patent 2,403,435, discloses and claims a coarsely subdivided free-flowing fumigant composition including a dispersion of a volatile liquid hydrocarbon in exploded mica, the average particle size of the mica carrier being at least 1/64 inch in diameter.

I claim:

1. A method for preventing the attack of growing plants by borer and soil organisms including the step of applying in contact with the soil and adjacent to the plant a composition comprising a volatile liquid halohydrocarbon dispersed in and on a coarsely subdivided solid carrier the average particle size of which is at least 1/64 inch in diameter.

2. A method for preventing the attack of growing plants by borer and soil organisms including the step of applying in contact with the soil and adjacent to the plant a composition comprising ethylene chloride dispersed in and on a coarsely subdivided solid carrier the average particle size of which is at least 1/64 inch in diameter.

3. A method for preventing the attack of growing plants by borer and soil organisms including the step of applying in contact with the soil and adjacent to the plant a composition comprising propylene chloride dispersed in and on a coarsely subdivided solid carrier the average particle size of which is at least 1/64 inch in diameter.

4. A method for controlling borer and soil organisms including the step of applying in contact with the soil a composition comprising a volatile liquid halohydrocarbon dispersed in and on a coarsely subdivided solid carrier the average particle size of which is at least 1/64 inch in diameter.

OSCAR H. HAMMER.

REFERENCES CITED

The following references are of record in the file of this patent:

UNITED STATES PATENTS

| Number | Name | Date |
|---|---|---|
| 1,003,541 | Stock | Sept. 19, 1911 |
| 1,696,709 | Dokkenwadel | Dec. 25, 1928 |
| 2,217,358 | Goltof | Oct. 8, 1940 |
| 2,240,859 | Rice | May 6, 1941 |

FOREIGN PATENTS

| Number | Country | Date |
|---|---|---|
| 448,371 | German | Aug. 20, 1927 |
| 439,874 | British | 1936 |
| 703,190 | German | Mar. 3, 1941 |

OTHER REFERENCES

Garden Encyclopedia, published 1939, article on Fumigation, pages 510 through 512 in all, page 512 can suffice. (Copy in Div. 1.)

Rideal, "Chemical Disinfection and Sterilization," published 1921, page 165. (Copy in Div. 63, article on Soil sterilization.)

Chemical Abstracts, vol. 36, column 608, published January 20, 1942, article entitled "Soil treatments with volatile liquids." (Copy in Scientific Library.)